(No Model.) 2 Sheets—Sheet 2.

C. H. RUDD.
SYSTEM OF TESTING FOR ELECTRIC CIRCUITS.

No. 476,490. Patented June 7, 1892.

Witnesses:
Chas. G. Hawley.
Ella Edler.

Inventor:
Charles H. Rudd.
By George P. Barton
Attorney.

UNITED STATES PATENT OFFICE.

CHARLES H. RUDD, OF EVANSTON, ASSIGNOR TO THE WESTERN ELECTRIC COMPANY, OF CHICAGO, ILLINOIS.

SYSTEM OF TESTING FOR ELECTRIC CIRCUITS.

SPECIFICATION forming part of Letters Patent No. 476,490, dated June 7, 1892.

Original application filed January 19, 1888, Serial No. 260,944. Divided and this application filed October 25, 1888. Serial No. 289,083. (No model.)

*To all whom it may concern:*

Be it known that I, CHARLES H. RUDD, a citizen of the United States, residing at Evanston, in the county of Cook and State of Illinois, have invented a certain new and useful Improvement in Testing Apparatus for Electric-Light Circuits, (Case No. 2,) of which the following is a full, clear, concise, and exact description, reference being had to the accompanying drawings, forming a part of this specification.

My invention is designed, primarily, to afford ready means of testing electric-light circuits to detect any leakage or imperfections in their insulation while the lamps are burning. Heretofore no specially-constructed apparatus for this purpose has been employed.

My invention consists in a condenser and telephone connected in the circuit and means for closing said circuit from different parts of the electric-light circuit through the telephone and condenser to the ground, as will be herein more particularly described in the description tive portion of the specification and formulated in the claims.

My invention is illustrated in the accompanying drawings, in which—

Figure 1:
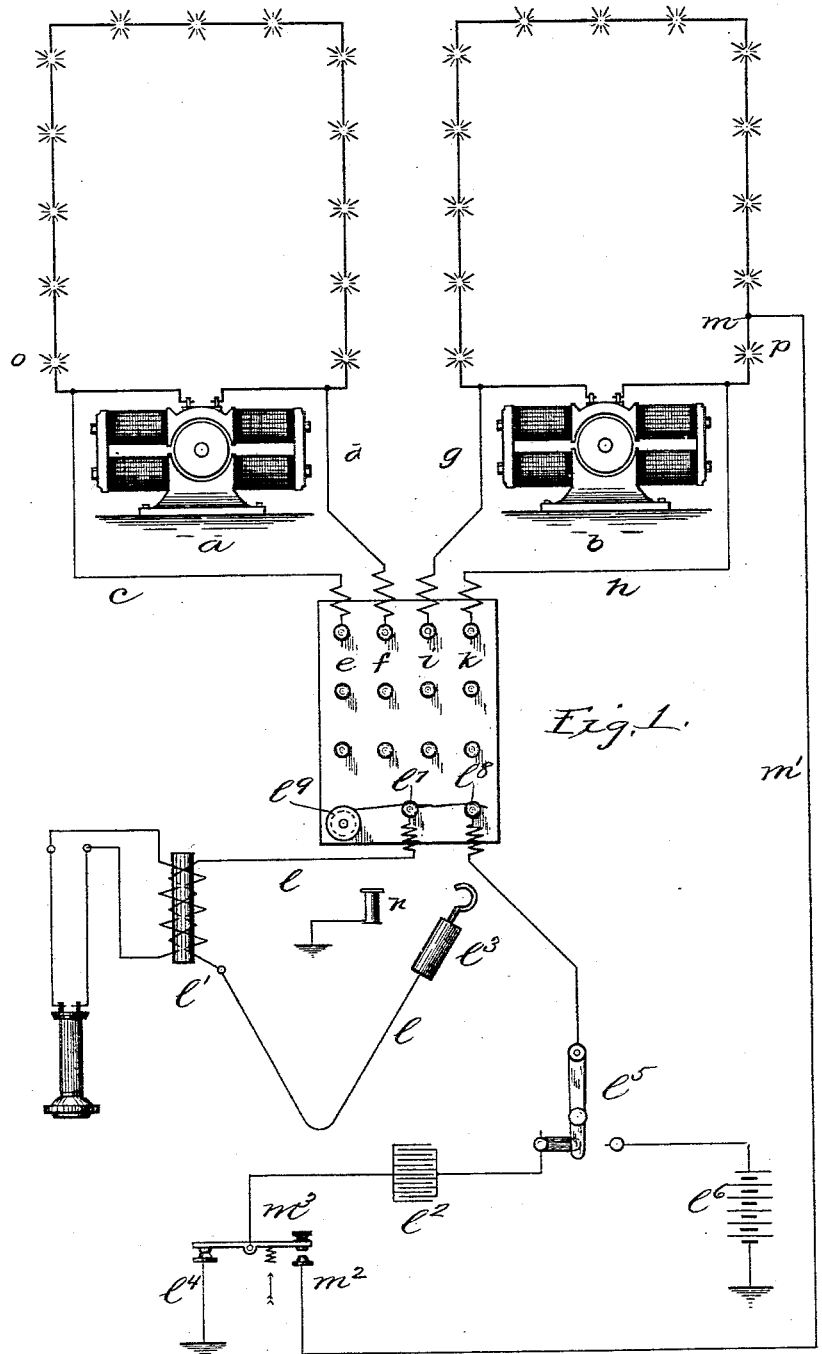
Figure 2:
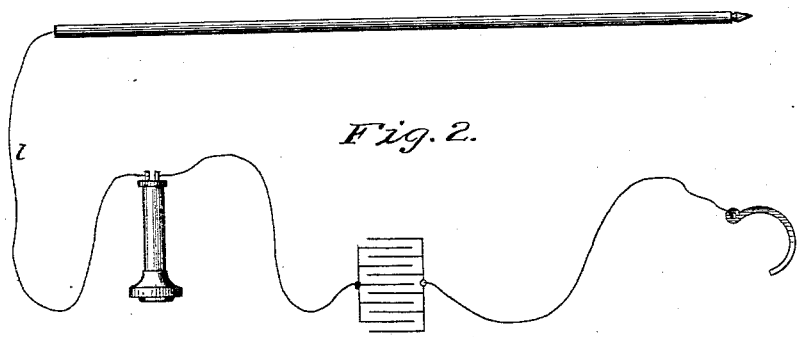
Figure 3:
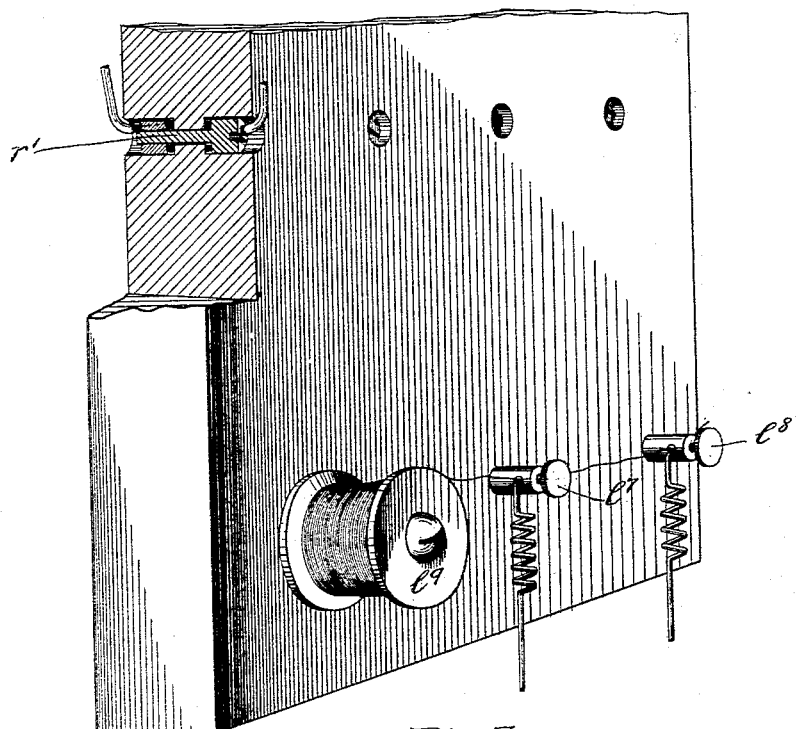

Figure 1 is a diagram illustrative of two arc-light circuits, each supplied by a separate dynamo-electric machine, a connecting-board provided with terminals for branches extending from said circuits on different sides of the dynamo-machines, together with my testing apparatus. Fig. 2 is a view of my testing apparatus constructed to be readily carried from place to place, so as to test the circuit at any desired point. Fig. 3 is a detailed view of the preferable form of my connecting-board with the fusible wire mounted thereon.

In Fig. 1 two dynamo-machines $a$ and $b$ are shown, each connected with a different electric-light circuit. From opposite sides of machine $a$ are extended branches $c\ d$ to terminals $e\ f$ upon the test-board. Similar branches $g\ h$ are extended from different sides of machine $b$ to terminals $i\ k$ of the test-board. The test-circuit $l$ includes the primary winding of the converter $l'$, the other winding of the converter including a telephone. A condenser $l^2$ is also provided in this circuit. A hook or connecting device $l^3$ forms one terminal of the test-circuit, while the other terminal is connected with ground-contact $l^4$. In this circuit I preferably provide a switch $l^5$ for disconnecting the portion of the circuit containing the telephone from the condenser and closing the same to a battery $l^6$. I preferably include in the test-circuit, as between binding-posts $l^7$ and $l^8$, a piece of fusible wire, as German-silver wire, which will be melted to interrupt the circuit if for any cause the current should be of undue strength. On the spool $l^9$ I wind a quantity of the fusible wire, in order that a new piece may be supplied readily in place of that which has been melted.

From a point $m$ between two of the lamps of one of the light-circuits I extend a branch $m'$ to a contact $m^2$, near a switch or key $m^3$ of the test-circuit, said key being between the condenser and the ground connection $l^4$. By depressing key $m^3$ the circuit is opened to ground at point $l^4$ and closed to contact $m^2$ of the circuit $m'$. In some convenient place near the terminal $l^3$ I provide a ground connection $n$, to which the terminal $l^3$ may be applied by the user when listening at the telephone for the purpose of observing the effect in the telephone of closing the terminal $l^3$ to ground when the dynamo is not running and the test is being made with the battery $l^6$.

In order to test a circuit—as, for example, the circuit of dynamo-machine $a$—the user will simply apply the connecting device or hook $l^3$ first to terminal $e$ of branch $c$ and then to terminal $f$ of branch $d$ while listening at the telephone. When the hook is applied to terminal $e$, if no sound is heard in the telephone the user will know that there is no leak upon the lamp-circuit unless between lamp $o$ and the machine. On repeating the test at terminal $f$ and hearing no sound in the telephone, he will know that no leak exists on any part of the lamp-circuit. If a leak were found to exist upon some portion of the line, the attendant, by means of portable apparatus, (like the apparatus illustrated in Fig. 2,) might go along the circuit testing at different points until he should come between two lamps from which no vibratory current was shunted through the telephone and condenser to ground. This would indicate to the experienced attendant that the trouble existed between those two lamps. If the attendant, having tested all the circuits, should find no indication of a leak upon any of them and should doubt the operativeness of his testing apparatus, he could readily test the same by connecting terminal $l^3$ with, for example, terminal $k$ and at the same time depressing key $m^5$. A vibratory current would be sent through the telephone or the induction-coil $l'$ of the telephone, since the potential of the current on the opposite sides of the line $p$ would be different. He would therefore know that his testing apparatus was in good condition if he found that the telephone responded when the metallic circuit was closed through the condenser and telephone from points of the lamp-circuit on different sides of one of the lamps $p$.

As shown in Fig. 3, the terminals upon the connecting-board are shown countersunk, so that they may not be liable to accidental connections. The testing apparatus is placed upon a shelf or table at the front of the connecting-board.

It is sometimes desirable to test a circuit before the machines begin running. For this purpose I provide a battery $l^6$ and switch $l^5$, by means of which the battery may be connected with the test-circuit. When the battery is thus connected, the user, by touching the terminal $l^3$ to the different terminals $e\,f$ and $i\,k$ of the lamp-circuits, may readily determine whether the circuits are properly insulated. If no leak or ground connection exists upon any line, the user, on applying the test-terminal $l^3$ to the different terminals of a lamp-circuit, will hear no sound in his telephone except the click caused by the static charge. The static charge will not cause more than two or three clicks unless the capacity is very heavy.

If any leak or ground connection is found upon any line, it will be indicated by current sent through induction-coil $l'$. By applying the terminal $l^3$ to the ground connection $n$ he may observe the effect in the telephone by closing battery $l^6$ directly to ground. In this way he will learn to distinguish between direct ground connections and leaks or partial grounds upon the lamp-circuits.

I preferably connect the telephone with the test-circuit through the medium of a converter or inductorium $l'$. It is evident that the telephone may be directly included in the test-circuit $l$, as shown in Fig. 2.

Having thus described my invention, I claim as new and desire to secure by Letters Patent—

1. The testing-circuit including a telephone and a condenser, the circuit of one side of the condenser being connected directly to ground, and a movable test terminal, in combination with terminals $e\,f$ of a lamp-circuit, extended from different sides of the dynamo-electric machine, whereby on connecting the movable terminal with the different extended terminals of the electric-light circuit the condition of the electric circuit with respect to insulation may be determined, substantially as and for the purpose specified.

2. The combination, with an electric-light circuit, of the branches $m'$ and $h$, extended from different sides of a lamp included in said circuit, and a test-circuit including a condenser and telephone, and means for including said test-circuit between the terminals of said branches, substantially as and for the purpose specified.

In witness whereof I hereunto subscribe my name this 4th day of October, A. D. 1888.

CHARLES H. RUDD.

Witnesses:
GEORGE P. BARTON,
CHAS. C. WOODWORTH.